(12) United States Patent
Straub et al.

(10) Patent No.: US 11,979,067 B2
(45) Date of Patent: May 7, 2024

(54) ELECTRICAL MACHINE HAVING AN ELECTRONICS CIRCUIT BOARD WHICH MAKES CONTACT WITH A STATOR HOUSING

(71) Applicant: Robert Bosch GmbH, Stuttgart (DE)

(72) Inventors: Bettina Straub, Buehl Eisental (DE); Gerold Schorpp, Au am Rhein (DE); Jens Benecke, Buehl (DE); Joerg Schmid, Achern (DE); Michael Ketterer, Buchenbach (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 17/405,698

(22) Filed: Aug. 18, 2021

(65) Prior Publication Data
US 2022/0060090 A1  Feb. 24, 2022

(30) Foreign Application Priority Data
Aug. 24, 2020 (DE) .......................... 102020210691.6
Jul. 27, 2021 (DE) .......................... 102021208084.7

(51) Int. Cl.
*H02K 13/00* (2006.01)
*H02K 5/04* (2006.01)
(Continued)

(52) U.S. Cl.
CPC ............ *H02K 13/006* (2013.01); *H02K 5/04* (2013.01); *H02K 7/003* (2013.01); *H02K 7/08* (2013.01); *H02K 11/01* (2016.01)

(58) Field of Classification Search
CPC ........ H02K 13/006; H02K 11/01; H02K 5/04; H02K 7/003; H02K 7/08
(Continued)

(56) References Cited

U.S. PATENT DOCUMENTS 4,852,568 A * 8/1989 Kensey .............. A61B 17/0057
                                                    606/1
5,528,093 A * 6/1996 Adam .................... H02K 23/66
                                                    310/239
(Continued)

FOREIGN PATENT DOCUMENTS

DE    3318362 A1    11/1984
DE    4225496 A1    2/1994
(Continued)

OTHER PUBLICATIONS

Machine translation of DE102013222534, Kaehler et al. (Year: 2015).*
(Continued)

*Primary Examiner* — Terrance L Kenerly
(74) *Attorney, Agent, or Firm* — Michael Best & Friedrich LLP

(57) ABSTRACT

An electrical machine (10), in particular for the adjustment of movable parts in the motor vehicle, having a stator housing (22) which accommodates a stator (12) and a rotor (14), wherein the rotor (14) has a rotor shaft (20) on which a commutator (18) is arranged, which commutator can be energized by means of electrical brushes (20), and the stator housing (22) has an axial opening (24) with an encircling edge (26), through which axial opening the rotor shaft (16) protrudes out of the stator housing (22), wherein an electronics circuit board (PCB) (30), which is populated with at least one interference-suppression element (44), is arranged transversely in relation to the rotor shaft (16), and the electronics circuit board (30), in its circumferential region (31), bears against the edge (26) in a conductive manner in order to form a ground contact with the stator housing (22).

21 Claims, 4 Drawing Sheets

(51) Int. Cl.
*H02K 7/00* (2006.01)
*H02K 7/08* (2006.01)
*H02K 11/01* (2016.01)

(58) Field of Classification Search
USPC ...................................................... 310/75 R
See application file for complete search history.

(56) References Cited

U.S. PATENT DOCUMENTS

| | | | | |
|---|---|---|---|---|
| 6,873,076 B2 * | 3/2005 | Kaeufl | ................... | H02K 11/38 310/239 |
| 2016/0197538 A1 | 7/2016 | Takamura et al. | | |
| 2020/0178391 A1 | 6/2020 | Kasuya et al. | | |

FOREIGN PATENT DOCUMENTS

| | | |
|---|---|---|
| DE | 102005055740 A1 | 6/2006 |
| DE | 102013001339 A1 | 7/2014 |
| DE | 102013211601 A1 | 12/2014 |
| DE | 102013222534 A1 * | 5/2015 ........... H02K 11/215 |
| DE | 102015219865 A1 | 4/2017 |
| DE | 102018221859 A1 | 6/2020 |
| EP | 258132 A1 | 3/1988 |

OTHER PUBLICATIONS

U.S. Patent Office Non-Final Action for U.S. Appl. No. 17/405,679 dated Jan. 12, 2023 (19 pages).

* cited by examiner

ELECTRICAL MACHINE HAVING AN ELECTRONICS CIRCUIT BOARD WHICH MAKES CONTACT WITH A STATOR HOUSING

BACKGROUND

The present invention relates to an electrical machine having an electronics circuit board which makes contact with a stator housing.

DE 42 25 496 A1 has disclosed an electric drive unit, in the case of which an intermediate frame is arranged between a pole pot and a transmission housing, into which intermediate frame a brush holder is integrated. Here, the drive unit is of modular construction, wherein a separately formed plug can be arranged at different positions on the drive unit. As a result, for example, different variants with or without an electronics housing can be realized, and, depending on the installation position of the drive unit, the plug connector can be adapted in accordance with the spatial conditions and the customer-specific mating plug. Here, the electronics housing with the electronics circuit board accommodated therein is always arranged radially outside the pole housing. One disadvantage with an embodiment of this type is that the electronics circuit board with the different electronics components emits electromagnetic interference radiation (EMC) which can be disruptive to other electronics functions in the motor vehicle. In addition, the brush contact also causes, in the intermediate frame, interference radiation which emits to the surroundings through the transmission housing composed of plastic. This disadvantage is to be eliminated by way of the electrical machine according to the invention.

SUMMARY

In contrast, the electrical machine according to the invention has the advantage that the printed circuit board can at the same time be used as a shielding plate which bears directly against the stator housing composed of metal. Here, the electronic components on the electronics circuit board are situated, just like the carbon brushes, inside the stator housing which, together with the electronics circuit board, forms a kind of Faraday cage which, as an EMC shielding means, shields the electromagnetic interference radiation that is produced to the outside. By way of the arrangement of the printed circuit board transversely in relation to the rotor shaft, the carbon brushes of the brush holder component can be connected directly to the printed circuit board by means of very short electrical paths. Owing to this design, the additional formation of a costly sheet-metal shielding means is dispensed with. An EMC shielding action can be achieved even for high frequencies up to, for example, 3 GHz by way of the shielding effect of a printed circuit board arranged in this way.

The electronics circuit board preferably bears, without interruption, over its entire circumference axially against the flange of the stator housing, with the result that a gap-free shielding cage can be realized on the circumference. The central aperture in the electronics circuit board for the rotor shaft can, however, be easily shielded by means of an additional shielding component in the end plate. As a result, the EMC radiation emitted by the carbon brushes and the electronics components on the printed circuit board is very reliably shielded against high frequencies too. As a result, for example, the brush carrier and/or the end plate can be mounted and positioned on the printed circuit board. As a result, the electric motor is of very compact design and has a high mechanical stability.

The shielding can be realized by the electronics circuit board in a particularly cost-effective manner by way of at least one continuously conducting conductor layer being arranged in the insulating substrate of the electronics circuit board, on which conductor layer no defect is formed owing to the design of circuits or the connection of electronics components. Continuously conducting conductor layers of this type can be manufactured as standard during printed circuit board production, wherein in particular equally two conductor layers of this type which conduct over the full surface area are arranged as axially inner layers, and the circuits and the electronics components are formed on two further outer conductor layers. Here, the at least one conductor layer which conducts over the full surface area is connected by means of axial plated-through holes to at least one axial side face of the printed circuit board which then bears axially in a conductive manner against the flange.

During the production of electronics circuit boards, the conductor layer which conducts continuously over the full surface area can be applied to the insulating substrate in a particularly simple manner as a thin metal layer—in particular composed of copper. However, in an alternative embodiment, this conductive layer can also be designed as a fine-mesh grid in which, in particular, tiny holes are made in the continuous conductor layer. Here, these holes are so small that the EMC radiation is also still sufficiently shielded up to the desired frequency upper limit of, for example, 3 GHz.

In order that the electronics circuit board bears reliably over its entire circumference against the flange, the printed circuit board has a radial overlap region with the flange. This overlap region is formed on the axial bottom side of the electronics circuit board in an electrically conductive manner with respect to the flange. As a result, a sufficiently low-impedance and symmetrical connection of the shielding to the stator housing is ensured over the service life. This can be realized, for example, in a simple manner by way of an additional metal coating, or by means of removing the uppermost insulation layer, so that the outer conductor layer is axially exposed in the overlap region.

The plated-through holes are particularly preferably arranged within the radial overlap region and, as a result, connect the electrically conductive overlap region on the bottom side to the conductor layer which conducts continuously over the full surface area in the interior of the electronics circuit board. In order to ensure sufficient EMC shielding, the spacings between the plated-through holes must not be too great in the circumferential direction. In particular, this maximum distance between the plated-through holes is at most 3 mm, as a result of which even high frequencies up to 3 GHz can also be shielded reliably.

In order to also shield the central aperture in the electronics circuit board with respect to EMC, a conductive ground contact region is formed on the top side of the electronics circuit board in the direction of the end plate around the central aperture. Said ground contact region is formed over a significant portion of the circumference and is electrically connected to the rotor bearing composed of metal. The electrical connection can be achieved by an additional conductive adapter element, or directly by forming an electrically conductive section on the end plate.

Plated-through holes are preferably also arranged along the ground contact region, which plated-through holes connect the electrically conductive ground contact region on the top side to a conductor layer which conducts continuously over the full surface area in the interior of the electronics circuit board. In order to ensure sufficient EMC shielding, the spacings between the plated-through holes must not be too great in the circumferential direction here either. In particular, this maximum spacing between individual plated-through holes in the ground contact region is at most 3 mm, as a result of which high frequencies up to 3 GHz can also be shielded reliably. The at least one inner conductor layer which conducts over the full surface area can be designed as two parallel conductor layers which conduct over the full surface area and are connected to one another by means of the axial plated-through holes. In particular, the plated-through holes pass through the electronics circuit board completely in the axial direction, so that they pass through the bottom side and the top side of the electronics circuit board, wherein they all electrically connect conductor layers of the electronics circuit board that are situated between said top side and bottom side to one another.

The stator housing advantageously has a flattened circular cross section, and therefore it can also be installed in a limited installation space—for example in the side door of the vehicle. The circumference therefore has two planar sections which are situated opposite and in parallel and two circular sections between them. Here, the electronics circuit board particularly advantageously has the same circumference, so that it extends radially beyond the dimensions of the axial opening of the stator housing over the entire circumference in order to form the overlap region with the flange. This creates a mechanically stable and electrically reliable flange connection. If the central aperture in the electronics circuit board is of rectangular or square design, a means for preventing rotation between the brush holder and the end plate can be formed by way of the electronics printed circuit board at the same time as a result.

The electronics circuit board can be produced in a particularly cost-effective manner using Surface Mounted Devices (SMD) technology in which all of the elements to be mounted are soldered on by means of SMD. Here, for example, at least one interference-suppression choke or one varistor, or one capacitor, or one thermal switch, or one Hall sensor is soldered onto the bottom side and/or the top side by means of SMD technology. The contact elements for the carbon brushes are likewise advantageously also designed as SMD parts. Owing to this SMD technology, the entire motor can be used up to a temperature of above 170°, and the electronics system is designed to be particularly vibration-resistant owing to the SMD mounting.

Plug-type holder brushes or else hammer brushes can be used for energizing the electric motor. The brushes are arranged on a separately produced brush holder component which is mounted on the bottom side of the electronics circuit board—and, in particular, is arranged axially completely inside the stator housing. For the purpose of making electrical contact with the brushes, they are connected, in particular welded, to the contact elements of the electronics circuit board, for example, by means of flexible braided current wires. The brush carrier component is preferably formed from plastic, with the result that plug-type holders for the brushes can be formed directly in one piece thereon. For assembly purposes, the brush holder component can first be electrically and mechanically connected to the electronics circuit board and then inserted axially into the stator housing, until the electronics circuit board bears axially against the flange. As a result, the brush holder component is shielded against EMC radiation by means of the electronics circuit board.

The electronics circuit board can be mounted axially between the flange of the stator housing and a counterflange of the transmission housing in a very simple manner using an axial assembly method. Here, the transmission housing can be manufactured from plastic. For example, the two housing parts are connected to one another by means of screwing or crimping or some other material deformation process. The radial edge of the electronics circuit board, which radial edge is not enclosed by the housing between the housing parts, can be covered, for example, by a protective layer which prevents ingress of liquid into the electronics circuit board.

An end plate which has a bearing seat for the rotor bearing is mounted on the top side of the electronics circuit board in a manner situated axially opposite the brush carrier component. The rotor bearing is designed as a cylindrical or spherical bearing, in particular from metal. The end plate can likewise be manufactured from plastic, but has an electrically conductive region around the bearing seat, which electrically conductive region connects the rotor bearing to the ground contact region of the electronics circuit board. To this end, the end plate can have a conductive coating, or a separately manufactured, electrically conductive adapter element which is braced axially firstly against the rotor bearing and secondly against the ground contact region. For example, the ground contact region and the adapter element are of approximately rectangular design, wherein the adapter element—or alternatively directly the end plate—preferably bears against the top side of the electronics circuit board in a conductive manner over the entire circumference of the central aperture.

The brush holder component particularly preferably has a circumferential axial wall situated radially opposite the circumferential wall of the stator housing. Centering elements are integrally formed on this wall, which centering elements position the brush holder—and therefore the carbon brushes—correctly in relation to the commutator. The brush holder is connected axially to the end plate which is arranged axially on the opposite top side of the electronics circuit board. To this end, in particular, connecting elements engage through the central aperture, so that the at least one conductor layer which conducts over the full surface area is not interrupted. For example, latching elements and/or clamping elements can be integrally formed on the brush holder and/or on the end plate, which latching elements and/or clamping elements interact with mating latching elements and/or clamping elements of the end plate and/or the brush holder. As a result, the brush holder and the end plate with the electronics circuit board situated between them are designed as a preassembled sandwich component. This sandwich component is centered by means of the brush holder in relation to the stator housing and by means of the outer contour of the bearing seat of the end plate in relation to the transmission housing. The electronics circuit board is positioned in the sandwich component through the central aperture in said electronics circuit board.

By way of arranging the separately manufactured connection plug radially outside the pole housing, the plug-in direction and position of the corresponding customer-specific mating plug can be adapted in a very simple manner to the space conditions of the installation space, without changing the basic design of the brush holder plate or of the end plate or of the electronics circuit board. By way of designing a motor kit with a brush carrier component which is always unchanged, the variation of the electronic functions, such as, for example, the rotor position detection or the electronic interference suppression, can be moved exclusively into the electronics circuit board which is simpler to change. By way of the unchanging stator housing interface, unchanging reliably satisfactory positioning of the brushes in relation to the commutator can therefore be ensured, and the electric motor can nevertheless be adapted to a very wide variety of customer requirements. Therefore, even in the case of different variants of the electronics circuit board and/or the connection plug, the stator housing/electronics circuit board/transmission housing interface can always be of unchanging design, with the result that the flanges of the stator housing and of the transmission housing are always sealed reliably.

By way of designing an electronics circuit board with a radial balcony which extends radially beyond the flange to the separately manufactured connection plug in a circumferential region, separately manufactured connecting elements from the electronics circuit board to the connection plug can be dispensed with. Here, both the connection pins for power supply and also the pins for the Hall sensor can be soldered directly to the balcony of the printed circuit board. No complicated bushings for the separate conductor elements are required in the electronics circuit board here. In addition, the electronics circuit board bears against the flange of the stator housing over a larger surface area in the circumferential region of the balcony and provides more space for the arrangement of electronic components close to the connection plug.

BRIEF DESCRIPTION OF THE DRAWINGS

The invention is described in greater detail in the following description on the basis of exemplary embodiments which are shown in the drawings, in which.

DETAILED DESCRIPTION

Figure 1:
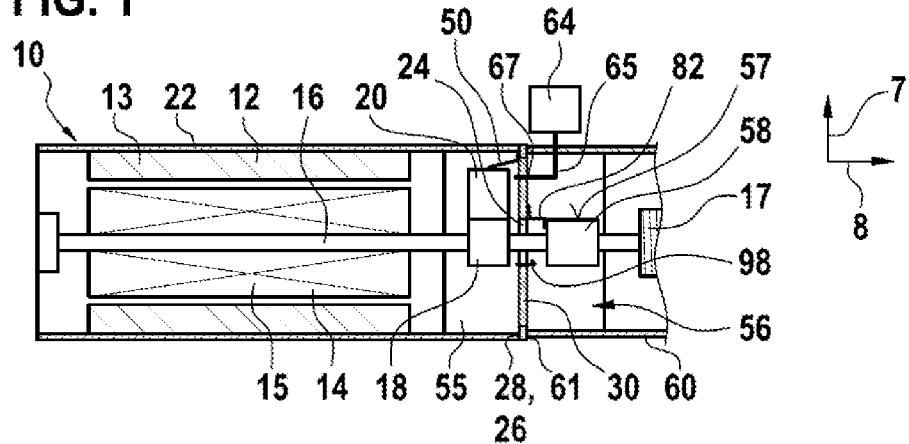
FIG. 1 shows an overall view of an electrical machine in accordance with a first exemplary embodiment.

FIG. 1 shows an electrical machine 10, as is used, for example, for the adjustment of movable parts—preferably window panes, sunroofs or seat components—in the motor vehicle. Here, a stator 12 is arranged in a stator housing 22, within which stator 12 a rotor 14 is arranged, the rotor shaft 16 of which extends axially from the stator housing 22 into an axially adjoining transmission housing 60. The stator 12 preferably has permanent magnets 13 which drive an electrical winding 15 of the rotor 14. Here, the drive torque is transmitted from the rotor shaft 16 to a transmission which is arranged in the transmission housing 60. Here, an output element 17—in particular a worm—which interacts with other transmission components is arranged on the rotor shaft 16. As a result, for example, parts of a vehicle seat or a window pane in the motor vehicle are moved by means of a mechanism (not shown). A brush holder plate 55 is arranged between the pole housing 22 and the transmission housing 60 in the axial direction 8, which brush holder plate 55 receives electrical brushes 20, for making electrical contact with a commutator 18 which is arranged on the rotor shaft 16. Here, the brushes 20 can be configured as hammer brushes or preferably as plug-type holder brushes 28. The brush holder plate 55 is produced, for example, as a plastic component and is preferably arranged radially completely inside the stator housing 22. Axially adjacently to the brush holder plate 55, an electronics circuit board 30 (PCB=Printed Circuit Board) is arranged transversely in relation to the rotor shaft 16. The electronics circuit board 30 has a central aperture 32, through which the rotor shaft 16 protrudes. On its radially outer circumference, the electronics circuit board 30 bears against the stator housing 22 in an electrically conductive manner. For example, a flange 28 is formed on an edge 26 of an axial opening 24 of the stator housing 22, against which flange 28 the electronics circuit board 30 bears in the axial direction 8. The electronics circuit board 30 has at least one conductor layer 36 which conducts over the full surface area and serves as a shielding plate for EMC radiation from the electrical machine 10. Interference-suppression elements and contact elements 50 for the electrical brushes 20 are arranged on the electronics circuit board 30 as electronic components 44. Furthermore, the electronics circuit board 30 is connected to a connection plug 64 for supplying power to the electrical machine 10, which connection plug 64 is arranged radially outside the stator housing 22. An end plate 56 which has a bearing seat 57 for a bearing component 58 of the rotor shaft 16 is arranged on the other axial side of the electronics circuit board 30 in a manner situated opposite the brush carrier plate 55. The bearing component 58 is designed, for example, as a cylindrical or spherical bearing composed of metal. Here, this bearing component 58 is connected in an electrically conductive manner to that conductor layer 36 of the electronics circuit board 30 which conducts over the full surface area. The end plate 56 is preferably connected axially to the brush holder plate 55 by means of clip elements or clamping elements 98, with the result that the electronics circuit board 30 is designed as a sandwich component 70 between the brush holder plate 55 and the end plate 56. Here, the extent of the electronics circuit board 30 in the radial direction 7 is preferably greater than that of the brush holder plate 55 and of the end plate 56. For example, the transmission housing 60 is connected to the stator housing 22 by means of connecting elements 66, as a result of which the electronics circuit board 30 is firmly fixed between the stator housing 22 and the transmission housing 60.

Figure 2:
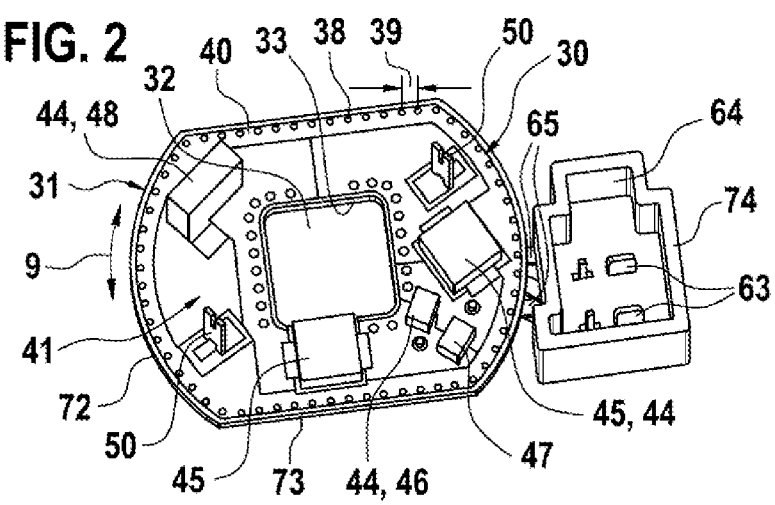
FIGS. 2 and 3 show a further exemplary embodiment of an electronics circuit board of an electrical machine from below and from above.

FIG. 2 shows a further exemplary embodiment of a bottom side 41 of an electronics circuit board 30 which faces the stator 12 axially. Just like the stator housing 22, the electronics circuit board 30 has a flattened circular cross section, with the result that an outer circumference 31 of the electronics circuit board 30 has circular segment-shaped sections 72 and two parallel sections 73 which are situated opposite one another. Here, the central aperture 32 for the rotor shaft 16 is designed approximately with a rectangular circumference 33, with the result that the latter can form a rotation-prevention means for the sandwich component 70. At least two contact elements 50 for the electrical brushes 20 are arranged on the bottom side 41, for example in a manner situated diagonally opposite one another. At least one interference-suppression choke 45 and/or one varistor 46, and/or one capacitor 47 and/or one thermal switch 48, are/is arranged on the electronics circuit board 30 as electronic components 44. These components 44 are all arranged in a region of the electronics circuit board 30 that is arranged radially inside the opening 24. An electrically conductive overlap region 40 with the stator housing 22 is formed circumferentially on the bottom side 41 on the radially outer circumference 31, which overlap region 40 bears against the flange 28 in a conductive manner. This conductive overlap region 40 is formed by a metallic coating on the insulating substrate 34, or in particular by removing an outermost insulation layer of the electronics circuit board 30. This outer overlap region 40 is electrically connected to the conductor layer 36 which conducts over the full surface area and is arranged in the interior of the electronics circuit board 30. In the exemplary embodiment, a large number of individual plated-through holes (VIAS) 38 are formed in a manner distributed over the outer circumference, which plated-through holes 38 connect the overlap region 40 to the other conductor layers 35 of the electronics circuit board 30. Here, the spacing 39 between the plated-through holes 39 is at most 3 mm, in order that sufficient EMC shielding is available. The connection plug 64, which is designed here as a component that is manufactured separately from the electronics circuit board 30, is arranged radially next to the electronics circuit board 30. The connection plug 64 is connected to the electronics circuit board 30 by means of conductor elements 65, wherein the one ends of said conductor elements form connection pins 63 for power supply. The opposite ends of the conductor elements 65 are guided from the top side 42, through the electronics circuit board 30, to its bottom side 41 by means of bushings 67. On the bottom side 41, the conductor elements 65 are connected in each case via the interference-suppression chokes 45 to the contact elements 50 for the brushes 20. The connection plug 64 has a plug collar 74, within which the connection pins 63 for making electrical contact with the electrical machine 10 are arranged. In the exemplary embodiment of FIG. 1, the plug collar 74 with the connector pins 63 extends in the axial direction 8, with the result that a corresponding plug can likewise be pushed in the axial direction 8 into the plug collar 74. The components 44 and the contact elements 50 for the brushes 20 are all designed as SMD components here, with the result that the electronics circuit board can be populated completely by means of a single Surface Mounted Devices (SMD) soldering process.

Figure 3:
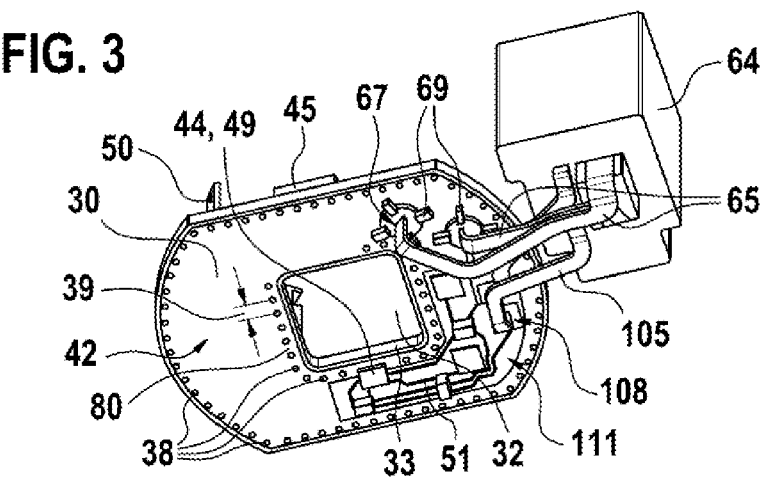

FIG. 3 shows a top side 42, which is situated axially opposite the bottom side 41, of the electronics circuit board 30, which top side 42 faces the transmission housing 60. An electrically conductive ground contact region 80 which is connected during assembly to the bearing component 58 is located on this top side 42 over the circumference 31 around the central aperture 32. This ground contact region 80—like the overlap region 40 on the bottom side 41—is also formed on the insulating substrate 34, for example, by way of a metallic coating. The ground contact region 80 is also electrically connected to the other conductor layers 35—and, in particular, to the inner conductor layer 36 which is designed in a conductive manner over the full surface area—by means of individual plated-through holes (VIAS) 38 which are arranged in a manner distributed over the circumference of the central aperture 32. The individual plated-through holes (VIAS) 38 in the overlap region 40 and in the ground contact region 80 are of continuous design axially through the entire electronics circuit board 30, with the result that they extend in each case from the bottom side 41 as far as the top side 42. The conductor elements 65 for connecting the connection plug 64 are connected, from the top side 42, to the electronics circuit board 30 as bushings 67 for supplying current to the brushes 20. In order to ensure electrical EMC shielding in the region of the bushing 67 through the electronics circuit board 30, in each case four CY capacitors 69 are arranged on the top side 42 around the bushings 67, which CY capacitors 69 point away from the bushing 67 in a star-shaped manner. The CY capacitors 69 are connected electrically to the conductor layer 36 which conducts over the full surface area and also makes electrical contact with the stator housing 22 and the bearing component 58. In addition to the conductor elements 65, signal lines 105 are also routed from the connection plug 64 to the top side 42 of the electronics circuit board 30, where they are connected to the magnetic sensor 49. To this end, contact is made with the ends of the signal lines 105 by contact pads 108 on the top side 42, which contact pads 108 are part of the circuitry arrangement 89 for the magnetic sensor 49.

Figure 4:
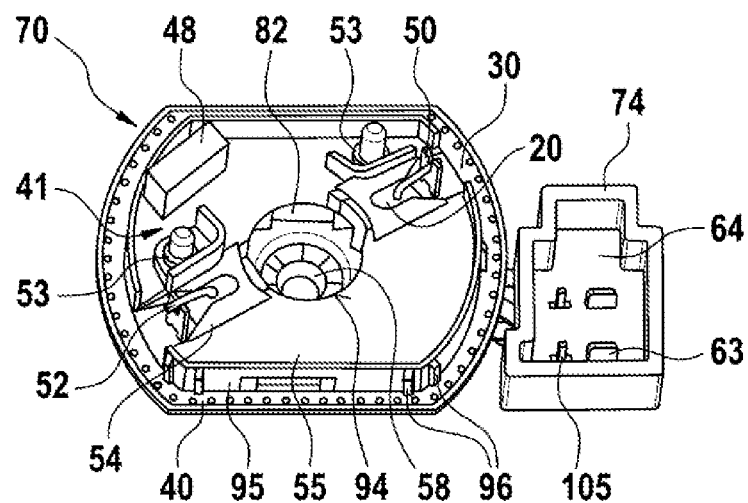
FIGS. 4 and 5 show the exemplary embodiment according to FIGS. 2 and 3 with an assembled sandwich component from below and from above.

FIG. 4 shows an embodiment of a sandwich component 70, in the case of which, in the view of the bottom side 41 according to FIG. 2, the brush holder plate 55 and the end plate 56 are assembled. Plug-type holders 54 which receive the electrical brushes 20 are formed on the brush holder plate 55. The brushes 20 each have a braided wire 52, which are electrically connected—for example welded—to the contact elements 50 for the brushes 20. The contact elements 50 are designed as tabs which project axially from the electronics circuit board 30 and engage axially through corresponding holes in the brush holder plate 55. In order to press on the brushes 20 radially, press-on springs 53 which bear, by way of a spring arm, against that side of the brush 20 which faces away from the commutator 18 are arranged on the brush holder plate 55. The thermal switch 48 engages axially through a cutout in the brush holder plate 55 and extends toward the rotor 14. On its outer circumference, the brush holder plate 55 has an encircling wall 95 which extends in the axial direction 8. Positioning elements 96 are integrally formed on said encircling wall 95, by means of which positioning elements 96 the brush holder plate 55 is centered in the stator housing 22. The brush holder plate 55 is then inserted axially completely into the stator housing 22. The overlap region 40 of the electronics circuit board 30 protrudes radially beyond the brush holder plate 55, with the result that the overlap region 40 bears in an electrically contact-making manner against the flange 28 of the stator housing 22 during the insertion of the sandwich component 70. The bearing component 58 which is received in the end plate 56 can be seen through a central passage opening 94 in the brush holder plate 55. Here, an electrically conductive adapter element 82 is clamped in axially between the bearing component 58 and the ground contact region 80 of the electronics circuit board 30 for the ground connection of the bearing component 58.

Figure 5:
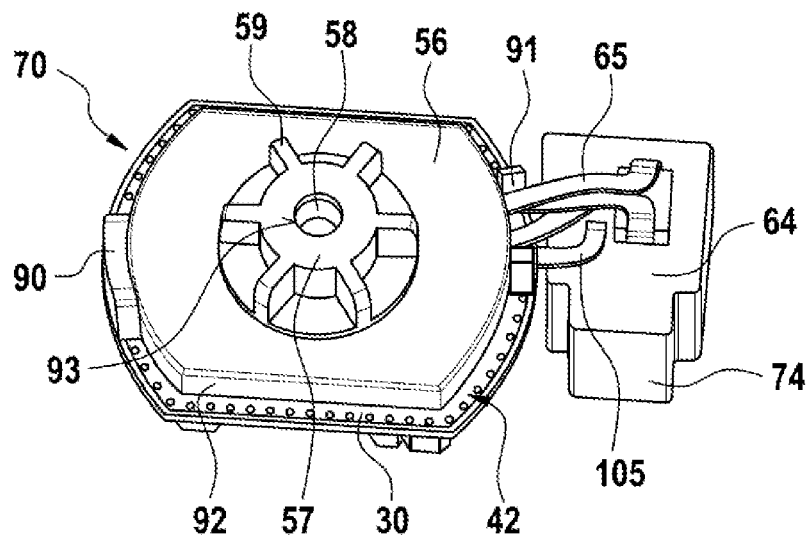

FIG. 5 shows the sandwich component 70 from FIG. 4 with a view of the top side 42 of the electronics circuit board 30 with the end plate 56 fitted. The bearing component 58 is inserted into the bearing seat 57 of the end plate 56. The end plate 56 also has a central passage hole 93, through which the rotor shaft 16 protrudes into the transmission housing 60. Radial webs 59 are formed on the end plate 56 on the rear side of the bearing seat 57 and optionally also center the end plate 56 in the transmission housing 60. The end plate 56 also has an encircling wall 92 which has a radial bushing 91 for the conductor elements 65. The electronics circuit board 30 also protrudes, at its top side 42, radially beyond the end plate 56. On this radial overhang, the transmission housing 60 bears axially against the electronics circuit board 30, in order to press the latter axially against the flange 28 in a conductive manner. Furthermore, the wall 92 has a radial projection 90 which is designed as a covering for a radial opening in the transmission housing 60 when the sandwich component 70 is assembled in a manner which is rotated by 180°, in order to position the connection plug 64 on the opposite side. At the same time, this radial projection 90 also forms a rotation-prevention means together with the corresponding opening on the transmission housing 60.

Figure 6:
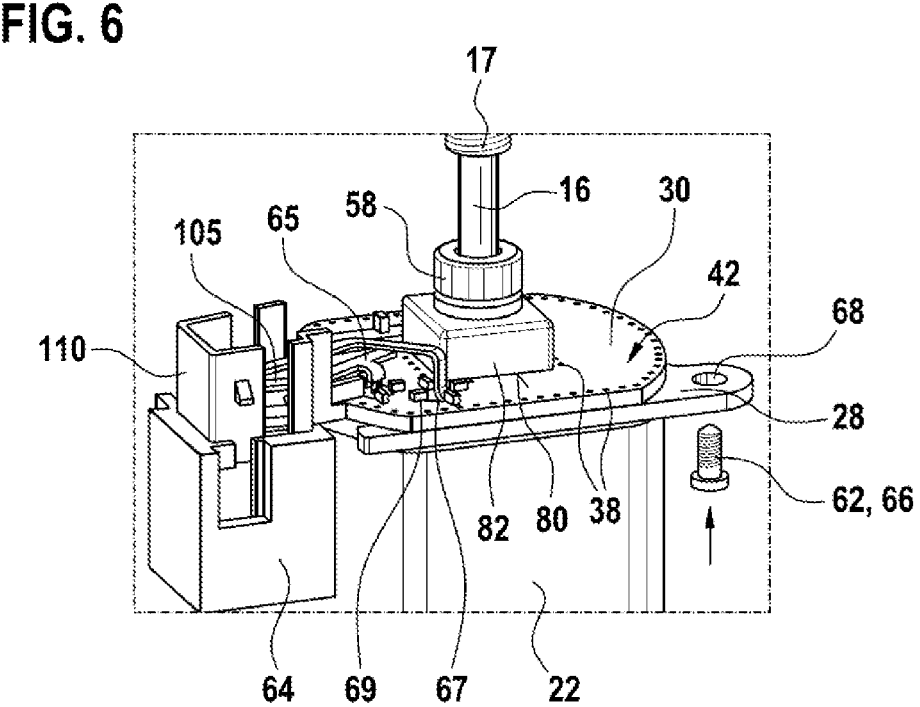
FIG. 6 shows a further embodiment of a printed circuit board which is mounted on the stator housing.

FIG. 6 diagrammatically shows how the brush holder plate 55 is inserted with the electronics circuit board 30 into the stator housing 60. The overlap region 40 of the bottom side 41 bears against the flange 28 in an electrically conductive manner. On the top side 42, the adapter element 82 bears axially against the ground contact region 80 around the central aperture 32. The bearing component 58 without an end plate 56 is also shown diagrammatically, which bearing component 58 in turn bears axially against the adapter element 82 in a conductive manner. Therefore, both the bearing component 58 and the stator housing 22 are connected over the full surface area in an electrically conductive manner to that conductor layer 36 of the electronics circuit board 30 which conducts over the full surface area. Here, the adapter element 82 comprises an electrically conductive material—for example metal—in order to shield the central passage opening 32 of the electronics circuit board 30 with respect to EMC. In this exemplary embodiment, screw-on eyelets 68 are formed on the flange 28, through which screw-on eyelets 68 screws 62 are preferably inserted into the transmission housing 60 as connecting elements 66. The connection plug 65 is connected to the stator housing 22 and the transmission housing 60, for example, by means of a connecting part 110 in which the conductor elements 65 and the signal lines 105 are routed.

In a further variant, not shown, a sliding contact to the rotor shaft is formed in the bearing component 58 and/or on the adapter element 82 in order to improve the ground contact from the stator housing 22 to the rotor shaft 16. Here, a resilient sheet-metal tongue or a spring wire or an electrically conductive nonwoven or mesh is pressed against the rotor shaft in a radially sliding manner.

Figure 7:
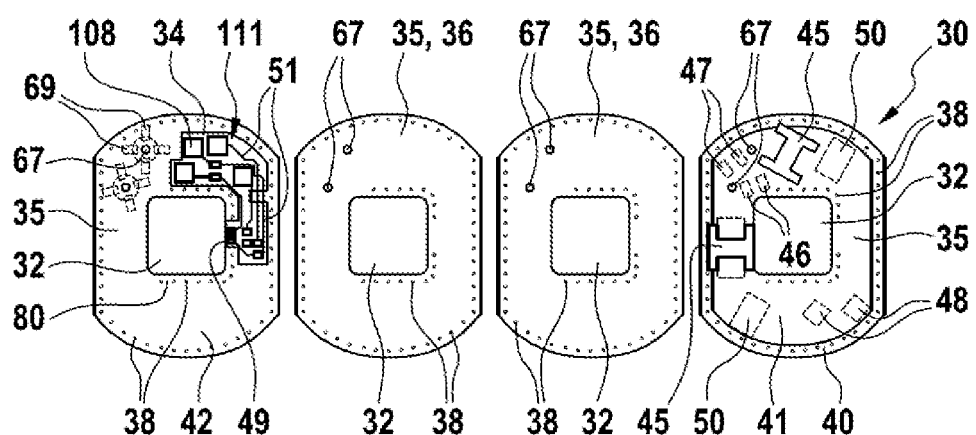
FIG. 7 shows a further exemplary embodiment of the structure of a printed circuit board.

FIG. 7 shows an exemplary embodiment of an electronics circuit board 30 which has a total of four conductor layers 35. Here, electronic components 44 and electronic circuits are arranged on the two outer conductor layers 35. Therefore, the Hall sensor 49, with its electronic conductor tracks 51, is configured on the top side 42, shown on the left. In addition, the conductor elements 65 are mounted in an electrically conductive manner on the electronics circuit board 30 by means of the bushings 67. Electrical contact is made with the shielding CY capacitors 69 on the top side 42. Here, the two axially inner conductor layers 35 are designed as conductor layers 36 which conduct over the full surface area and which serve for EMC shielding. This means that these conductor layers 36 which conduct over the full surface area do not have circuits or further cutouts. The two conductor layers 36 which conduct over the full surface area likewise have the central aperture 32 for the rotor shaft 16. The plated-through holes 38 in the overlap region 40 and in the ground contact region 82 pass through all the conductor layers 35 in a conductive manner. From the top side 42, contact is made with the conductor elements 65 by the electronics circuit board 30 by means of the bushings 67, wherein the bushings 67 are shielded against interference radiation by means of the CY capacitors 69. The conductor layers 36 which conduct over the full surface area are preferably formed from an uninterrupted metal layer, but alternatively can also be designed as a very fine metal mesh in which the hole size thereof is matched to the EMC frequency to be shielded against. On the bottom side 41, the connections for the electronic components 44 which extend toward the brush holder plate 55 are formed on the outer conductor layer 35. Therefore, the receiving slots for the SMD components including the interference-suppression chokes 45, the varistor 46, the capacitor 47, the thermal switch 48 and the contact elements 50 for the brushes 20 are preferably formed on the bottom side 41. Insulation layers, which together form the electronics circuit board 30, are arranged between the individual conductor layers 35.

Figure 8:
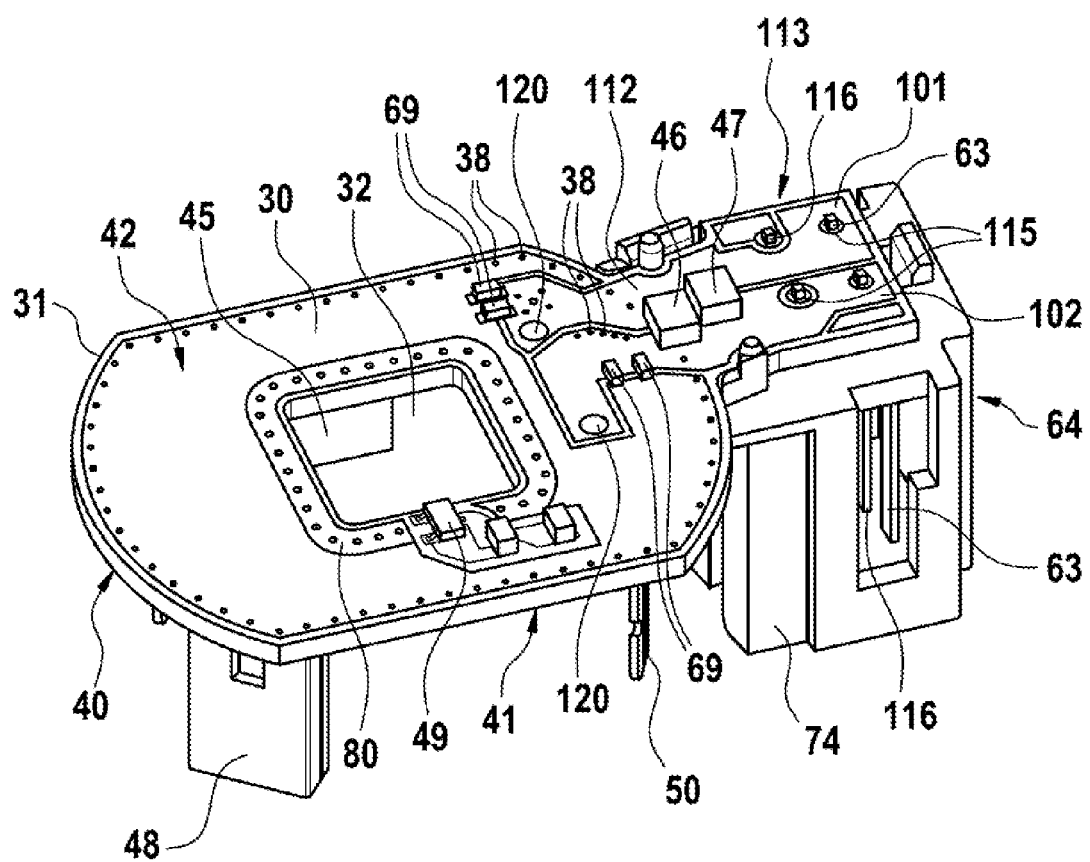
FIG. 8 shows a further exemplary embodiment of an electronics circuit board.

FIG. 8 shows a top side 42 of a further embodiment of an electronics circuit board 30 which has a radial balcony 113 which protrudes radially beyond the flange 28 of the stator housing 22. On the top side 42, the conductive ground contact region 80, which is interrupted by the Hall sensor 49 at one point, is again formed over the circumference 31 around the central aperture 32. The plated-through holes 38 are formed in a manner distributed over the radially outer edge of the electronics circuit board 30. In the circumferential region 112 on which the separately formed connection plug 64 is arranged, the balcony 113 of the electronics circuit board 30 extends over the connection plug 64. On the bottom side 41, the electrically conductive overlap region 40, which here extends, in particular, over the entire radial dimension of the flange 28 and is electrically connected via plated-through holes 38 to the at least one conductor layer 36 which conducts over the full surface area, is again formed in said circumferential region 112. At least two regions 101, 102 with different electrical potentials are formed on the balcony 113, said two regions each being directly connected to a corresponding connection pin 63 for supplying power to the electric motor 10. The connection pins 63 are, for example, soldered directly into passage holes 115 of the electronics circuit board 30—preferably as are further pins 116 for the Hall sensor 49. The connection pins 63 and the further pins 116 extend axially into the plug collar 74 of the connection plug 64. The two regions 101, 102 for the power supply are each connected to the further conductor layers 35 by means of CY capacitors 69. Plated-through holes 38 are likewise formed between the two regions 101, 102. Owing to the radial extent of the balcony 113, more installation space is available for the electronic components 44, and therefore a varistor 46 and a capacitor 47 are arranged between the two regions 101, 102, for example, on the top side 42 of the balcony 113. In addition, test pads 120, by means of which the electronics circuit board 30 can be checked for the functionality thereof in the installed state, are formed in the regions 101 and 102. In this embodiment, the end plate 56, not shown, has a radial projection which radially covers the balcony 113 and is connected—in particular latched—to the connection plug 64. In this embodiment, the separately formed conductor elements 65 and the signal lines 105 for connection to the connection plug 64 can be dispensed with.

It should be noted that the specific shape, illustrated in the figures, of the stator housing 22, the transmission housing 60 and the connection plug 64 can be matched to the corresponding application of the electrical machine 10. For example, the electronics circuit board 30 can also receive different electronic components 44 depending on requirements. Here, the magnetic sensor 49 can be arranged directly at the central aperture 32 in order to interact with a transmitter magnet on the rotor shaft 16. Similarly, the geometry and configuration of the printed electronics circuit board 30 can be varied, and for example be formed with fewer than or more than four conductor layers 35, wherein at least one conductor layer 36 which conducts over the full surface area is arranged in the electronics circuit board 30. The central aperture 32 can also have a cross section that differs from a rectangular shape. Electrical contact can be made with the overlap region 40 and/or the ground contact region 80, for example, by means of a metallic coating of the electronics circuit board 30 or by means of exposing a conductor layer 35 of the electronic circuit board 30. The outer circumference of the electronics circuit board 30 can also have a real circular shape or any desired outer contour instead of a flattened circle.

What is claimed is:

1. An electrical machine (10) having a stator housing (22) which accommodates a stator (12) and a rotor (14), wherein the rotor (14) has a rotor shaft (20) on which a commutator (18) is arranged, which commutator can be energized by electrical brushes (20), and the stator housing (22) has an axial opening (24) with an encircling edge (26), through which axial opening the rotor shaft (16) protrudes out of the stator housing (22), wherein an electronics circuit board (PCB) (30), which is populated with at least one electronic component (44), is arranged transversely in relation to the rotor shaft (16), and the electronics circuit board (30), in its circumferential region (31), bears against the edge (26) in a conductive manner to form a ground contact with the stator housing (22) wherein the electronics circuit board (30) has a plurality of spaced-apart conductor layers (35) in an axial direction (8) in an insulating substrate, at least one of the conductor layers designed as conductor layer (36) that is produced from conductive material, without circuits, over an entire surface area thereof, and the conductor layers (35, 36) are electrically connected to one another by a plurality of axial plated-through holes (38).

2. The electrical machine (10) according to claim 1, wherein the electronics circuit board (30) bears axially against a flange (28), which is formed on the edge (26), over its entire circumference (31) in a conductive manner, and the electronics circuit board (30) completely covers the opening (24) of the stator housing (22) apart from a central aperture (32) in the electronics circuit board (30) for the rotor shaft (16).

3. The electrical machine (10) according to claim 1, wherein the at least one conductor layer (36), which is formed from conductive material over its entire surface area, is designed as a continuous, uninterrupted metal layer or as a fine-mesh metal lattice.

4. The electrical machine (10) according to claim 1, wherein at least one axial bottom side (41) of the electronics circuit board (30), which bottom side faces a flange (28), is of electrically conductive design in a radial overlap region (40) with the flange (28), and the plated-through holes (38) are arranged between the conductor layers (35, 36) at their circumferences in the radial overlap region (40).

5. The electrical machine (10) according to claim 1, wherein a separately manufactured end plate (56), in which a bearing component (58) of the rotor shaft (16) is received, is arranged on a top side (42) of the electronics circuit board (30), which top side faces away from a flange (28), wherein the bearing component (58) is connected to the electronics circuit board (30) by an electrically conductive adapter element (82).

6. The electrical machine (10) according to claim 5, wherein, at a circumference of a central aperture (32), the top side (42) of the electronics circuit board (30) is designed in an electrically conductive manner as a ground contact region (80) in order to make electrical contact with the bearing component (58) or a ground sliding contact (77) of the rotor shaft (16), which ground sliding contact is formed on the adapter element (82), via the adapter element (82).

7. The electrical machine (10) according to claim 1, wherein, at a circumference of a central aperture (32), electrical plated-through holes (38) are likewise arranged between the conductor layers (35, 36), wherein the plated-through holes (38) are at a maximum distance (39) of 2-3 mm from one another in the circumferential direction (9).

8. The electrical machine (10) according to claim 1, wherein the electronics circuit board (30) and the axial opening (24) of the stator housing (22) have circular sections (72) and straight sections (73), which are situated parallel to one another, wherein a central aperture (32) has an approximately square cross-sectional area.

9. The electrical machine (10) according to claim 1, wherein, on the electronics circuit board (30), contact is made with all of the electronic components (44) on at least one axial bottom side (41) and/or a top side (42) by SMD (Surface Mounted Devices) technology.

10. The electrical machine (10) according to claim 1, wherein contact elements (50) for energizing the electrical brushes (20) are arranged on at least one axial bottom side (41), which faces a flange (28), wherein the contact elements (50) are connected to electrical brushes (20) of a separately manufactured brush holder plate (55) by braided wires (52).

11. The electrical machine (10) according to claim 1, wherein a transmission housing (60) bears, by way of a counterflange (61), against the electronics circuit board (30) in a manner situated axially opposite the stator housing (22), and is screwed to the stator housing (22).

12. The electrical machine (10) according to claim 1, wherein the electronics circuit board (30) is connected to a separately manufactured connection plug (64), which is arranged completely radially outside the stator housing (22), by conductor elements (65).

13. The electrical machine (10) according to claim 12, wherein the electronics circuit board (30) has a radial balcony (113) which, in a circumferential region (112), extends radially beyond a flange (28) to the separately manufactured connection plug (64), and connection pins (63) of the connection plug (64) are soldered directly in the balcony (113) of the electronics circuit board (30).

14. The electrical machine (10) according to claim 10, wherein radial positioning elements (96) are formed on a radial circumferential contour (95) of the brush holder plate (55), which positioning elements position the position of the brushes (20) in relation to the commutator (18), and wherein the brush holder plate (30) is connected to an end plate (56) through a central aperture (32) of the electronics circuit board (30) via an adapter element (82) by clip or clamping elements (98).

15. The electrical machine (10) according to claim 1, wherein there are four spaced-apart conductor layers (35).

16. The electrical machine (10) according to claim 1, wherein there are two conductor layers designed as conductor layer (36) that are produced from conductive material, without circuits, over an entire surface area thereof.

17. The electrical machine (10) according to claim 4, wherein the plated-through holes (38) are at a maximum distance (39) of 2-3 mm from one another in the circumferential direction (9).

18. The electrical machine (10) according to claim 9, wherein the electronic components include at least one interference-suppression choke (45), or one varistor (46), or one capacitor (47), or one thermal switch (48), or one Hall sensor (49).

19. The electrical machine (10) according to claim 9, wherein contact elements (50) for the brushes (20) are mounted by means of SMD technology.

20. An electrical machine (10) having a stator housing (22) which accommodates a stator (12) and a rotor (14), wherein the rotor (14) has a rotor shaft (20) on which a commutator (18) is arranged, which commutator can be energized by electrical brushes (20), and the stator housing (22) has an axial opening (24) with an encircling edge (26), through which axial opening the rotor shaft (16) protrudes out of the stator housing (22), wherein an electronics circuit board (PCB) (30), which is populated with at least one electronic component (44), is arranged transversely in relation to the rotor shaft (16), and the electronics circuit board (30), in its circumferential region (31), bears against the edge (26) in a conductive manner to form a ground contact with the stator housing (22) wherein a separately manufactured end plate (56), in which a bearing component (58) of the rotor shaft (16) is received, is arranged on a top side (42) of the electronics circuit board (30), which top side faces away from a flange (28), wherein the bearing component (58) is connected to the electronics circuit board (30) by an electrically conductive adapter element (82).

21. An electrical machine (10) having a stator housing (22) which accommodates a stator (12) and a rotor (14), wherein the rotor (14) has a rotor shaft (20) on which a commutator (18) is arranged, which commutator can be energized by electrical brushes (20), and the stator housing (22) has an axial opening (24) with an encircling edge (26), through which axial opening the rotor shaft (16) protrudes out of the stator housing (22), wherein an electronics circuit board (PCB) (30), which is populated with at least one electronic component (44), is arranged transversely in relation to the rotor shaft (16), and the electronics circuit board (30), in its circumferential region (31), bears against the edge (26) in a conductive manner to form a ground contact with the stator housing (22), wherein a transmission housing (60) bears, by way of a counterflange (61), against the electronics circuit board (30) in a manner situated axially opposite the stator housing (22), and is screwed to the stator housing (22).

* * * * *